US011347594B2

(12) United States Patent
LePera et al.

(10) Patent No.: US 11,347,594 B2
(45) Date of Patent: May 31, 2022

(54) INTER-PROCESSOR COMMUNICATIONS FAULT HANDLING IN HIGH PERFORMANCE COMPUTING NETWORKS

(71) Applicant: International Business Machines Corporation, Armonk, NY (US)

(72) Inventors: William P. LePera, Wappingers Falls, NY (US); Sameh Sherif Sharkawi, Cypress, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 423 days.

(21) Appl. No.: 16/695,556

(22) Filed: Nov. 26, 2019

(65) Prior Publication Data

US 2021/0157691 A1 May 27, 2021

(51) Int. Cl.
*G06F 11/00* (2006.01)
*G06F 11/14* (2006.01)
(Continued)

(52) U.S. Cl.
CPC ............ *G06F 11/1443* (2013.01); *G06F 9/54* (2013.01); *G06F 11/1438* (2013.01); *G06F 11/2023* (2013.01); *G06F 2209/548* (2013.01)

(58) Field of Classification Search
CPC .... G06F 9/54; G06F 11/0703; G06F 11/0709; G06F 11/0793; G06F 11/1438; G06F 11/1443
See application file for complete search history.

(56) References Cited

U.S. PATENT DOCUMENTS 6,766,467 B1 * 7/2004 Neal .................... G06F 11/0727
714/5.11
7,526,549 B2   4/2009 Block et al.
(Continued)

OTHER PUBLICATIONS

Gao et al. "Application-transparent checkpoint/restart for MPI programs over InfiniBand." 2006 International Conference on Parallel Processing (ICPP'06). IEEE, 2006.
(Continued)

*Primary Examiner* — Michael Maskulinski
(74) *Attorney, Agent, or Firm* — Garg Law Firm, PLLC; Rakesh Garg; Nathan Rau (57) ABSTRACT

A computer-implemented method and system for inter-processor communications fault handling in high performance computing networks. The method includes detecting that an InfiniBand (IB) queue pair has transitioned into an error state based on an unsuccessful completion status that relates to unsuccessful delivery of a message from an initiator endpoint at a first server device to at least one target endpoint at a second server device. The initiator and target endpoints are associated with at least one application under execution. An embodiment includes inferring, when the unsuccessful completion status is indicated as flushed, that the message was in a send queue of the IB queue pair when the IB queue pair transitioned into the error state. An embodiment includes establishing an IB Direct Connect queue pair connection between the target and initiator endpoints. An embodiment includes re-queueing the message in the IB queue pair for dispatch to the target endpoint.

20 Claims, 6 Drawing Sheets

(51) Int. Cl.
    *G06F 11/20*     (2006.01)
    *G06F 9/54*     (2006.01)

(56) References Cited

U.S. PATENT DOCUMENTS

| | | |
|---|---|---|
| 9,231,892 B2 | 1/2016 | Baphna et al. |
| 9,836,431 B2 | 12/2017 | Huang et al. |
| 2014/0173338 A1* | 6/2014 | Arroyo ............... G06F 11/1484 714/15 |

OTHER PUBLICATIONS

Agbaria et al., "Starfish: Fault-tolerant dynamic MPI programs on clusters of workstations." Proceedings. The Eighth International Symposium on High Performance Distributed Computing (Cat. No. 99TH8469). IEEE, 1999.

Gopalakrishnan, Enhancing Fault Tolerance in MPI for Modern InfiniBand Clusters. Diss. The Ohio State University, 2009.

Ip.com, "Detecting Non-Responding (Hung) Ports in Infiniband Networks", Dec. 3, 2014, IP.com No. IPCOM000239818D, https://ip.com/IPCOM/000239818.

Drummond, "Impact of Communication Networks on Fault-Tolerant Distributed Computing", Apr. 30, 1986, IP.com, IP.com No. IPCOM000148368D, https://ip.com/IPCOM/000148368.

\* cited by examiner

INTER-PROCESSOR COMMUNICATIONS FAULT HANDLING IN HIGH PERFORMANCE COMPUTING NETWORKS

GOVERNMENT RIGHTS

This invention was made with Government support under B604134 awarded by ASC (Advance Simulation and Computing). The Government has certain rights in this invention.

TECHNICAL FIELD

The present invention relates generally to data processing systems, and more particularly, to inter-processor fault handling in high performance computing networks.

BACKGROUND

Inter-Processor Communication (IPC) allows multiple servers to work together on a single application. InfiniBand (IB) is a switch-based point-to-point interconnect architecture and provides high bandwidth, low-latency reliable connection that is required between servers to ensure reliable processing. To manage the communication within a subnet, the InfiniBand architecture defines a communication management scheme for error reporting, link failover, chassis management and other services.

The InfiniBand architecture supports message passing semantics and enables support for messaging high performance communication channels between nodes or endpoints and provides applications with an easy-to-use messaging service. This service can be used to communicate with other applications or processes or to access storage. Instead of making a request to the operating system for access to one of the server's communication resources, an application accesses the InfiniBand messaging service directly. The InfiniBand architecture gives every application direct access to the messaging service, where the application need not rely on the operating system to transfer messages. This is in contrast to a standard network environment where the shared network resources (e.g. the TCP/IP network stack and associated NICs) are solely owned by the operating system and cannot be accessed by the user application.

InfiniBand provides the messaging service by creating a channel connecting an application to any other application or service with which the application needs to communicate. These messaging channels serve as pipes or connections between entirely disjoint virtual address spaces where the two virtual spaces might even be located in entirely disjoint physical address spaces—in other words, hosted by different servers even over a distance.

SUMMARY

The illustrative embodiments provide a method, system, and computer program product. An embodiment includes detecting that an InfiniBand (IB) queue pair has transitioned into an error state based on an unsuccessful completion status that relates to unsuccessful delivery of a message from an initiator endpoint at a first server device to at least one target endpoint at either of a second server device or at the first server device. The initiator and at least one target endpoints are associated with at least one application under execution. An embodiment includes inferring, based on the unsuccessful completion status of the message being indicated as flushed, that the message was in a send queue of the IB queue pair when the IB queue pair transitioned into the error state. An embodiment includes establishing, based on the inferring, an IB Direct Connect queue pair connection between at least one target endpoint and the initiator endpoint. An embodiment includes re-queueing, in accordance with the IB Direct Connect queue pair connection, the message in the IB queue pair for dispatch to at least one target endpoint.

An embodiment includes a computer usable program product. The computer usable program product includes one or more computer-readable storage devices. Program instructions stored on at least one of the one or more storage devices are executable in one or more processors to provide for efficient, accurate and responsive communication error fault handling in high performance computing networks based on an InfiniBand communication protocol.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide efficient, accurate and responsive communication error fault handling in high performance computing networks based on an InfiniBand communication protocol.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that there is a need for providing efficient, accurate and responsive communication error fault handling in high performance computing networks based on an InfiniBand communication protocol. Embodiments herein provide for managing communication errors in an Infiniband environment by "short-circuiting" conventional execution paths between device drivers through multiple communication levels to application programs by allowing application programs to receive communication error indications in certain circumstances via established callback, as opposed to existing approaches which terminated execution of said applications after certain communication errors.

Other technical advantages and benefits described include, in embodiments, that the application(s) under inter-processor execution has a way to detect failures and take action based on them. Embodiments herein detect both physical and network-related failures in the InfiniBand communications path between computer systems by monitoring status of the Infiniband messages themselves, and notify the user application of such failures via a registered callback function, giving the user application control over how to handle the error. Without the solutions and systems in accordance with embodiments described herein, the communications stack would have simply terminated the inter-processor high performance computing job.

Illustrative embodiments herein eliminate or minimize the latter problems and provide mechanisms for efficient, accurate and responsive communication error fault handling in high performance inter-processor computing networks based on an InfiniBand communication protocol. In particular, embodiments provide advantageous solutions, techniques and systems for managing communication errors in an Infiniband environment by bypassing conventional execution paths between device drivers through multiple communication levels to application programs under execution, by allowing application programs to receive message error indications in certain circumstances via established callback, as opposed to existing approaches which terminated execution of said applications after certain message errors.

An embodiment can be implemented as a high performance application constituted of any combination of hardware and software program instructions. The application implementing an embodiment can be configured as a modification of existing server computing devices or systems, or as a separate application that operates, in some embodiments in parts, in conjunction with local or remote server devices, or some combination thereof.

A method of an embodiment described herein, when implemented to execute on a multi-server or a cloud network based data processing system, comprises substantial advancement of the functionality of that device or data processing system to provide efficient, accurate and responsive communication error fault handling in high performance computing networks based on an InfiniBand communication protocol.

The illustrative embodiments are described with respect one or more applications that are constituted of any combination of hardware and software program instructions, including applications installed on server devices and systems that under concurrent and inter-processor execution, local and remotely located server devices being in inter-processing communications via messages implemented in high performance computing networks based on an InfiniBand communication protocol, techniques and systems allowing application programs to receive communication error indications in certain circumstances via storage devices, data processing systems, virtual machines and container environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using an application at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
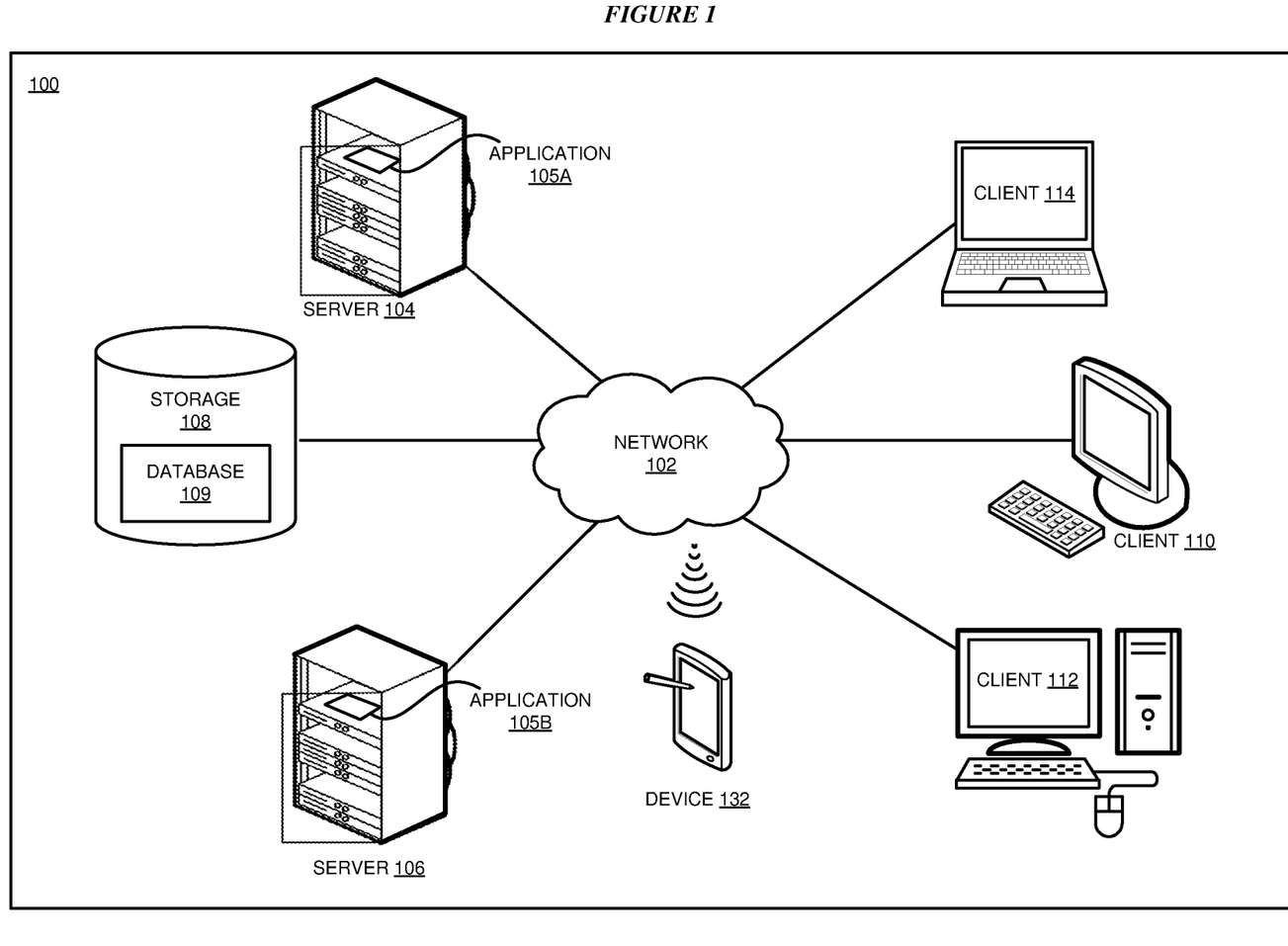
FIG. 1 depicts a block diagram of a network of data processing systems in which illustrative embodiments of handling inter-processing InfiniBand communication faults are implemented.
Figure 2:
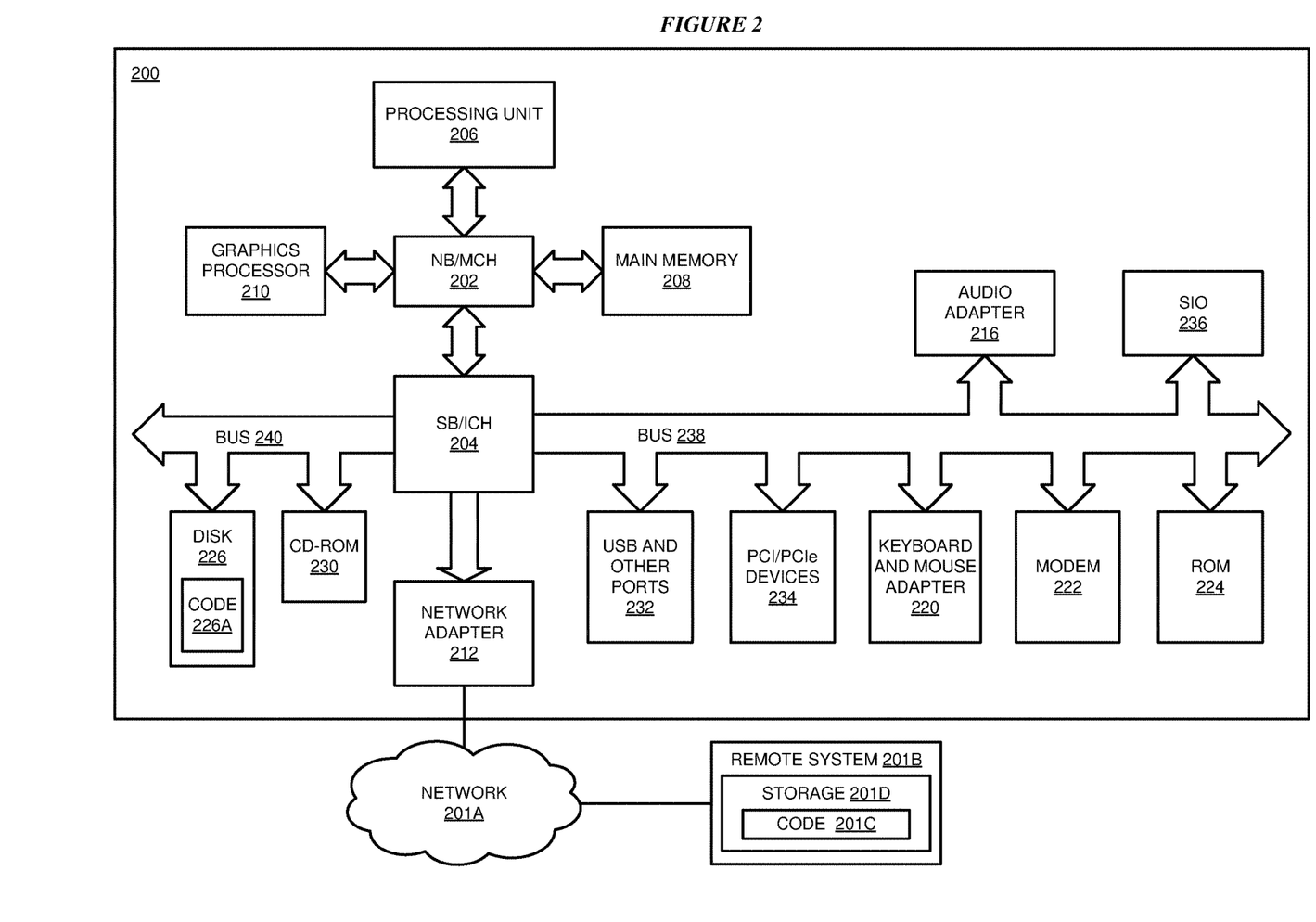
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments of handling inter-processing InfiniBand communication faults are implemented. Data processing environment 100 is a network of computers in which the illustrative embodiments are implemented and includes both cloud based and edge based compute resources and devices. Data processing environment 100 includes network 102. Network 102 is the medium used to provide communications links between various cloud and edge devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 112, 114 and 132 are edge computing devices also coupled to network 102. A data processing system, such as server 104 or 106, or clients 112, 114 and 132 may contain data and may have software applications or software tools executing thereon.

Only as an example, and without implying any limitation to such architecture, FIG. 1 depicts certain components that are usable in an example implementation of an embodiment. For example, servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

A high performance computing application 105 under execution in counterparts 105A, 105B implemented via inter-processor cooperative execution between server devices 104, 106 respectively in embodiments described herein. Cooperatively executed counterparts 105A, 105B are referred to collectively as application 105 herein. Application 105 can be comprised of any combination of hardware and software program instructions executable in one or more processors. Application 105 can execute in servers 104 and 106, in conjunction with storage unit 108 coupled to network 102 using wired connections, wireless communication protocols, or other suitable data connectivity.

In other embodiments, applications 105A and 105B may be separate or different applications under execution at servers 104, 106. Application 105A can be a local application hosted at a local server 104, and exchange messages directly with remote application 105B residing in a separate virtual address space. In most cases, the second application 105B ("remote application") is physically hosted by an entirely separate server 106.

In the depicted example, server 104 provides data, such as boot files, operating system images, and applications to clients 112, 114. Clients 112, 114 and mobile device 132 are be edge computing client devices to server 104 in this example. Clients 112, 114 as well as device 132 may include their own data, boot files, operating system images, and applications. Data processing environment 100 may include additional servers, clients, and other devices that are not shown.

In the depicted example, cloud based data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing inter-processing communications between application executing at one or more applications at server devices 104, 106. Data processing environment 100 may also be used for implementing a client-server environment in which the illustrative embodiments may be implemented. A client-server environment enables software applications and data to be distributed across a network such that an application functions by using the interactivity between a client data processing system and a server data processing system. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 can be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
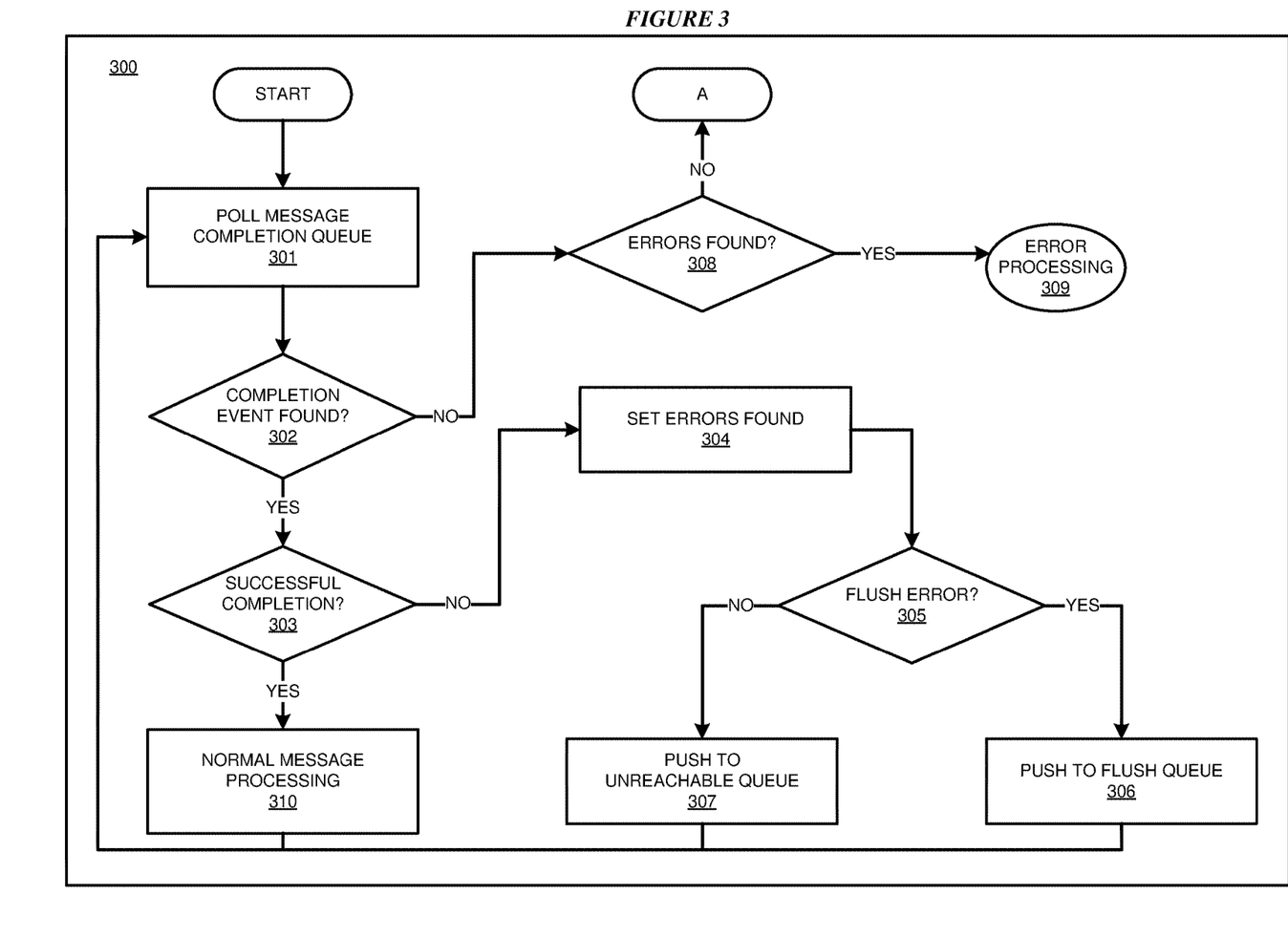
FIG. 3 depicts an illustrative embodiment of an algorithm for a message advance operation in detecting inter-processing InfiniBand communication faults.

FIG. 3 depicts an illustrative embodiment of an algorithm for a message advance operation in detecting inter-processing InfiniBand communication faults. In process 300 depicted in FIG. 3, error messages are parsed based on message completion status and pushed to either one of a flush queue or an unreachable queue. In embodiments, any completion state that is not indicated as SUCCESS in IB Completion Status is treated as an error, and any error completion is stored in a queue of unreachable messages either to be reported back to the caller, or to a queue of flush messages to be re-sent to the original destination.

At block 301, the message sender polls at block 302 for the completion status of messages posted. However, if, at block 303, a message for a particular endpoint returns with an unsuccessful completion status, the entire QP transitions into an error state at 304 to set errors found. At 305, if determined as a flush error, the message is pushed to the flush queue at block 306. If not determined as a flush error, the messages are pushed to the queue containing messages for an unreachable destination at block 307.

At block 308, based on no completion event found from block 302, any errors found are subject to normal error processing at block 309. At block 310, any messages having a successful completion status from block 303 are subject to normal message processing.

In particular, without the embodiment methods and systems provided herein, where the messages being parsed based on completion status and stored in one of the two fault tolerant queues, once the error state is encountered and the QP transitions into error state, the message communications job in accordance with existing IB protocol would have simply terminated.

Figure 4:
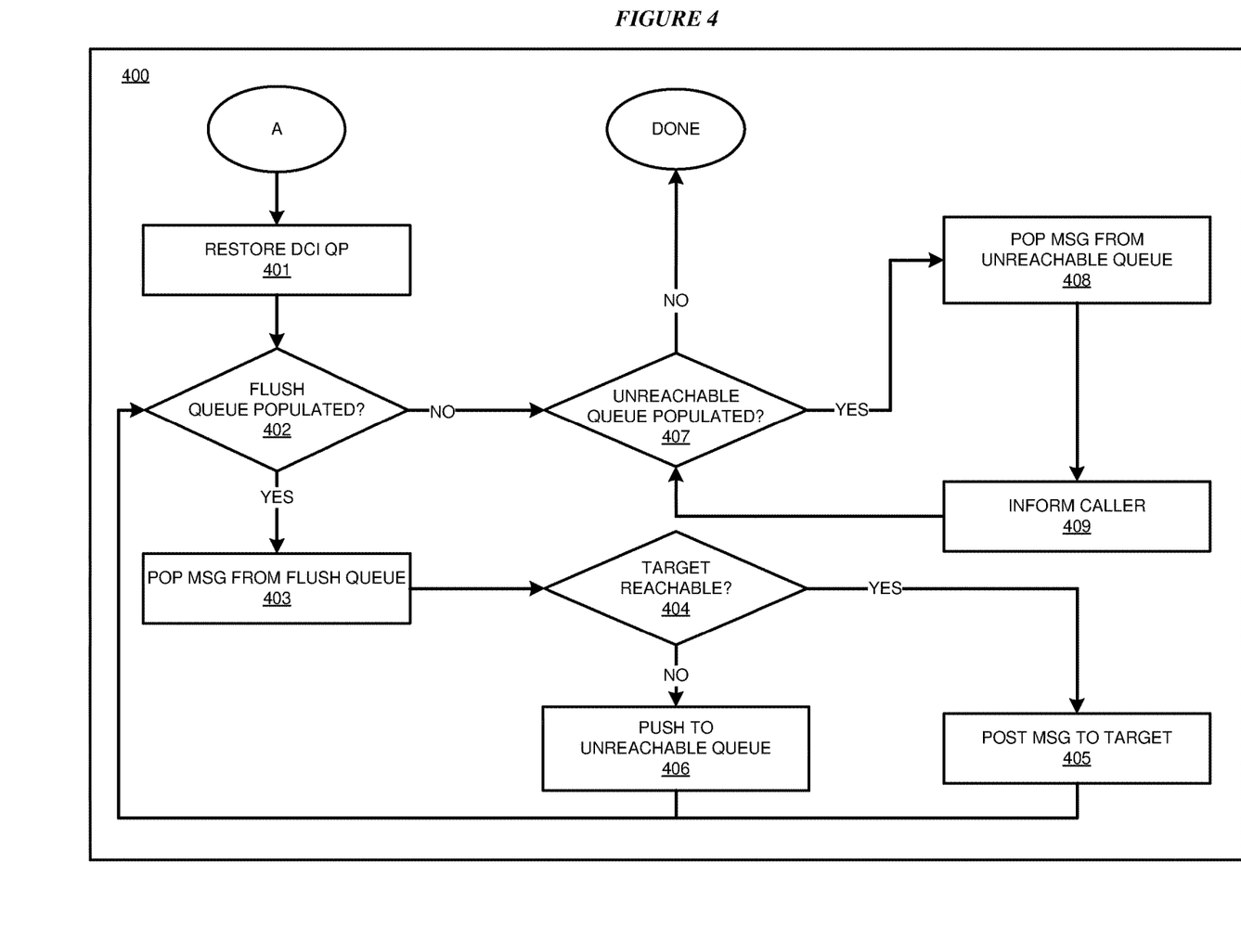
FIG. 4 depicts an illustrative embodiment of an algorithm for handling inter-processing InfiniBand communication faults.

FIG. 4 depicts an illustrative embodiment of processing 400 of the two fault tolerant queues after the message advance process of FIG. 3 for handling inter-processing InfiniBand communication faults. In particular, FIG. 4 shows the processing of the two fault tolerant message queues, "flush" and "unreachable", after the message advance of FIG. 3 has completed. An application accesses InfiniBand's message transport service by posting a Work Request (WR) to the work queue. A WR, once placed on the work queue, is in effect an instruction to the InfiniBand RDMA message transport to transmit a message on the channel or to perform a control function on the channel. A queue pair (QP) is mapped into the application's virtual address space. Each application is given one or more "virtual interfaces" to the same shared hardware. Address translation enables an application residing in its own virtual address space to exchange messages directly between a local application and a remote application residing in a separate virtual address space. In most cases, the second application ("remote application") is physically hosted by an entirely separate server. The InfiniBand transport protocol enables this sort of "cross-server" direct communication by providing for the exchange of a set of virtual addresses and keys between the local application and the remote application.

In embodiments, a SEND/RECEIVE operation works as follows. The remote (receiving) application uses a Post Receive Request verb to build one or more work requests (WRs) which are placed on a receive queue. Each RECEIVE WR represents a receive buffer in the application's virtual address space. The local (sending) application uses a Post Send Request verb to place one or more WRs on a send queue. Each WR on the (local application) send queue represents a message that the application wishes to be sent to the other application at the other end of the channel. Thus, a SEND operation targets a buffer represented by a WR on the receive queue at the opposite end of the channel. The sending application does not know the virtual address of the buffer to which the SEND is targeted; instead the SEND is targeted to the (remote application) receiver QP's receive queue, which contains a pointer to the application's buffer.

At block 401, the application under execution restores a Dynamic Connect (DC) initiator (DCI) queue pair (QP) for message communications with at least one DC target (DCT) endpoint. The DCI QP is capable of posting messages to processes running on other servers, each of which represents a distinct endpoint and hosts a DC Target.

In IB, a message sender associated with an application under execution polls for the completion status of the posted messages. As long as the messages are sent and acknowledged successfully, the QP remains viable. However, if a message for a particular endpoint returns with an unsuccessful completion status, the QP transitions to an error state. IB messages are posted in a queue to be sent to their destination. When a QP goes to error state, the first completion status will show the reason for the failure.

IB supports a mode where a completion event will only be posted when an error occurs, and in some cases QP states related to completion status in IB provides the status of each individual message that is posted onto a QP, and includes
IBV_WC_SUCCESS
IBV_WC_WR_FLUSH_ERR
Other QP states and WR completion status in InfiniBand can include:
IBV_QPS_RESET—When a QP is created, it's in the reset state
IBV_QPS_RTR—"Ready to receive" QP can now receive messages
IBV_QPS_RTS—"Ready to send" QP can now send messages
IBV_QPS_ERROR—Error state, QP can no longer be used to send or receive At block 402, determining whether a flush queue is populated with messages. A completion failure related to any target endpoints will cause the QP that services all of those remote endpoints to transition into the error state. When the QP will transitions into error state, any messages in the queue not yet sent will be flushed, and the flushed messages marked with a flush status that indicates this message was in the send queue when the QP went to error state. However, the messages that were flushed may still contain messages that were intended for target endpoints that are still viable.

At block 403, based on determining the flush queue is populated with messages, inferring that the message was in a send queue of the IB queue pair when the IB queue pair transitioned into an error state.

At block 404, determining whether the DC target endpoint is reachable.

At block 405, based on determining that the DC target endpoint is reachable, re-posting, into the send queue of the queue pair, the messages intended for the DC target endpoint. Essentially, after the QP is restored, the messages in the flush queue are checked to see if they were intended for a destination already known as unreachable. If so, they are pushed to the queue containing messages for an unreachable destination. Otherwise they are re-posted to the QP to be sent to their original destination.

At block 406, based on determining that the DC target endpoint is unreachable, then posting the messages intended for the DC target endpoint into an unreachable queue.

At block 407, upon determining that the flush queue is not populated with messages, then determining whether queued error messages are intended for a destination or target endpoint indicated as unreachable.

At block 408, based on determining that the error messages are intended for an unreachable target endpoint, then populating a buffer with the messages from the unreachable queue. Messages in the unreachable queue will each have a unique identifier, and these messages based on the IDs will be sent back to the application for processing.

At block 409, the application then signals to the communication stack, notifying a caller in accordance with a callback registered with the communication stack, of the error messages and destinations that cannot be reached.

Embodiments herein eliminate the problems of the existing solutions based at least in part upon providing fault tolerance error recovery solutions in high performance interprocessor computing. In accordance with embodiments described herein, among other technical advantages and benefits, the error recovery and communication mechanisms described herein can be correlated with other cloud and edge compute devices, storage, cloud virtual machines, high performance application types, error recovery and processing techniques, fault tolerant algorithms and communication stack structures, and other algorithms in handling communication faults in high performance computing via inter-processing among multiple servers, including within an InfiniBand network.

Figure 5:
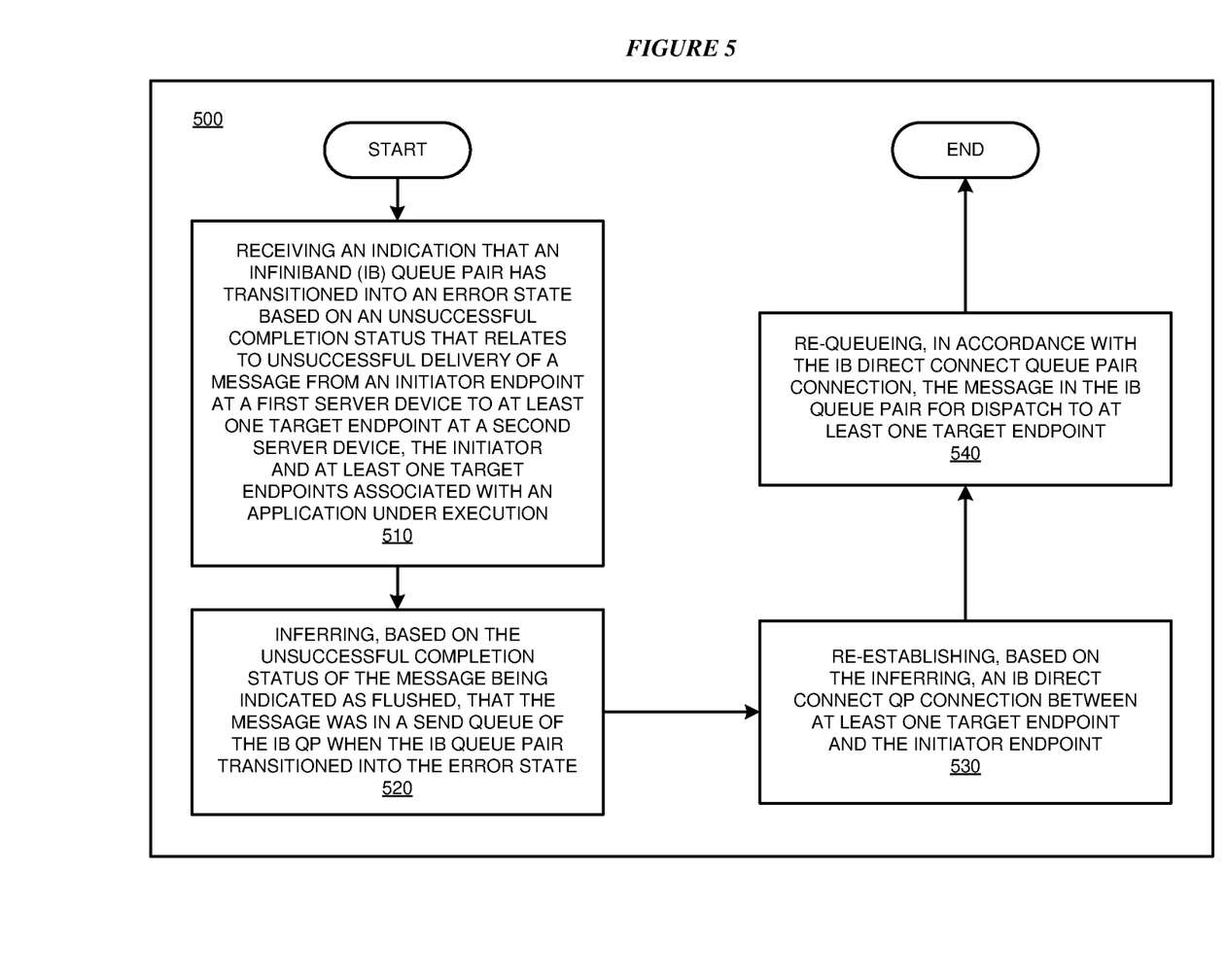
FIG. 5 depicts a flowchart, in an illustrative embodiment, of handling inter-processing InfiniBand communication faults.

FIG. 5 depicts a flowchart, in an illustrative embodiment 500, of handling inter-processing InfiniBand communication faults. At block 510, detecting, using one or more processors, that an InfiniBand (TB) queue pair has transitioned into an error state based on an unsuccessful completion status. The unsuccessful completion status relates, in an embodiment, to unsuccessful delivery of a message from an initiator endpoint at a first server device to at least one target endpoint at a second server device, the initiator and the at least one target endpoints being associated with at least one application under execution.

At block 520, inferring, using the one or more processors based on the unsuccessful completion status of the message being indicated in a memory of the first server device as flushed, that the message was in a send queue of the IB queue pair when the IB queue pair transitioned into the error state. In embodiments, Infiniband indicates the message completion status, and notifies the initiator endpoint when messages are flushed, or cleared out, from a buffer that manifests the queue.

At block 530, establishing, based on the inferring, an IB Direct Connect queue pair connection between the at least one target endpoint and the initiator endpoint.

At block 540, re-queueing, in accordance with the IB Direct Connect queue pair connection, the message in the IB queue pair for dispatch to the at least one target endpoint. Without the embodiment methods and systems provided herein, once the error state is encountered and the QP transitions into error state, the message communications job in accordance with existing IB protocol would simply terminate. The message advance embodiments described herein provide for the messages being parsed based on completion status and stored in one of two queues. Essentially, after the QP is restored, the messages in the flush queue are checked to ensure they are not intended for a destination already known as unreachable; if they are, they are pushed to the queue containing messages for an unreachable destination. Otherwise they are re-queued to the QP to be sent to their original destination in accordance with block 540.

In an embodiment, the at least one application under execution comprises a fault-tolerant application under inter-processor execution at the first and second server devices. The first and second server devices are communicatively coupled within an InfiniBand protocol based network. In alternate embodiments, the at least one application under execution comprises a fault-tolerant application under inter-processor execution at a single server device.

In other embodiments, the at least one application comprises a first application under execution at the first server device, and a second application, different from the first, under execution at the second server device.

The method further comprises, in an embodiment, prior to receiving the indication that the InfiniBand (IB) queue pair has transitioned into the error state, establishing, in response to the application registering a call back with a communications stack, an original InfiniBand Direct Connect queue-pair connection between the initiator endpoint and at least one target endpoints. The communications stack monitors a completion status of message communications between the initiator and target endpoints across an InfiniBand network. The completion status, in some embodiments, comprises the unsuccessful completion status and a message undeliverable status, the message undeliverable status being associated with the target endpoint indicated as communicatively unreachable. In one embodiment, the completion status comprises the unsuccessful completion status and a message undeliverable status, the message undeliverable status associated with the target endpoint indicated as communicatively unreachable.

Figure 6:
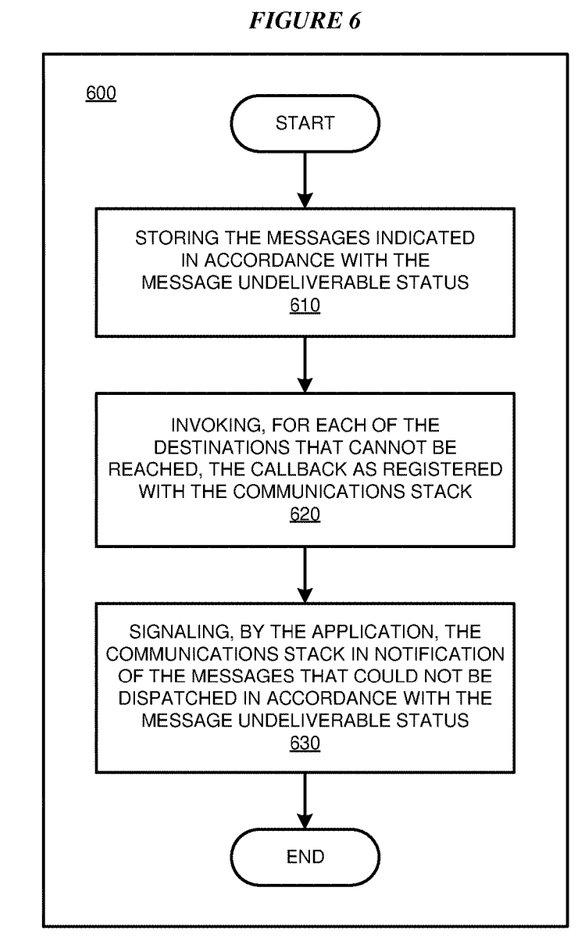
FIG. 6 depicts a flowchart, in another an illustrative embodiment of handling inter-processing InfiniBand communication faults.

FIG. 6 depicts a flowchart, in another illustrative embodiment 600 of handling inter-processing InfiniBand communication faults. In some embodiments, steps described in reference to FIG. 6 can be performed in conjunction with the steps described with regard to FIG. 5.

At block 610, storing, in a memory of the first server device, the messages indicated in accordance with the message undeliverable status.

At block 620, invoking, using the one or more processors, for each of the destinations that cannot be reached, the callback as registered with the communications stack.

At block 630, signaling, by the first application, the communications stack in notification of the messages that could not be dispatched to the at least one target endpoint in accordance with the message undeliverable status.

Thus, a computer implemented method, system or apparatus, and computer program product are provided in the illustrative embodiments for handling high performance inter-processor computing InfiniBand communication faults. Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other lightweight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    detecting, using one or more processors, that an InfiniBand (IB) queue pair has transitioned into an error state based on an unsuccessful completion status, the unsuccessful completion status relating to unsuccessful delivery of a message from an initiator endpoint at a first server device to at least one target endpoint at a second server device, the initiator and at least one target endpoints associated with at least one application under execution;
    inferring, using the one or more processors based on the unsuccessful completion status of the message being indicated in a memory of the first server device as flushed, that the message was in a send queue of the IB queue pair when the IB queue pair transitioned into the error state;
    establishing, based on the inferring, an IB Direct Connect queue pair connection between the at least one target endpoint and the initiator endpoint; and
    re-queueing, in accordance with the IB Direct Connect queue pair connection, the message in the IB queue pair for dispatch to the at least one target endpoint.

2. The computer-implemented method of claim 1, wherein the at least one application under execution comprises a fault-tolerant application under inter-processor execution in parts at the first and second server devices.

3. The computer-implemented method of claim 1, wherein the first and second server devices are communicatively coupled within an InfiniBand protocol based network.

4. The computer-implemented method of claim 1 further comprising:

establishing, using the one or more processors in response to the application registering a call back with a communications stack, an original InfiniBand Direct Connect queue-pair connection between the initiator and the at least one target endpoints.

5. The computer-implemented method of claim 4, wherein the communications stack monitors a completion status of message communications between the initiator and the at least one target endpoints across an InfiniBand protocol based network.

6. The computer-implemented method of claim 5, wherein the completion status comprises the unsuccessful completion status and a message undeliverable status, the message undeliverable status associated with the at least one target endpoint indicated as communicatively unreachable.

7. The computer-implemented method of claim 6 further comprising:
storing, in a memory of the first server device, the messages indicated in accordance with the message undeliverable status;
invoking, using the one or more processors, for each of the destinations that cannot be reached, the callback as registered with the communications stack; and
signaling, by the application, the communications stack in notification of the messages that could not be dispatched in accordance with the message undeliverable status.

8. The computer-implemented method of claim 1, wherein the at least one application comprises a first application under execution at the first server device, and a second application under execution at the second server device.

9. A computer usable program product comprising one or more computer-readable storage media, and program instructions collectively stored on at least one of the one or more storage media, the program instructions when executed in one or more processors causing operations comprising:
detecting that an InfiniBand (IB) queue pair has transitioned into an error state based on an unsuccessful completion status, the unsuccessful completion status relating to unsuccessful delivery of a message from an initiator endpoint at a first server device to at least one target endpoint at a second server device, the initiator and at least one target endpoints associated with at least one application under execution;
inferring, based on the unsuccessful completion status of the message being indicated as flushed, that the message was in a send queue of the IB queue pair when the IB queue pair transitioned into the error state;
establishing, based on the inferring, an IB Direct Connect queue pair connection between the at least one target endpoint and the initiator endpoint; and
re-queueing, in accordance with the IB Direct Connect queue pair connection, the message in the IB queue pair for dispatch to the at least one target endpoint.

10. The computer usable program product of claim 9, wherein the at least one application under execution comprises a fault-tolerant application under inter-processor execution in parts at the first and second server devices.

11. The computer usable program product of claim 9, wherein the first and second server devices are communicatively coupled within an InfiniBand protocol based network.

12. The computer usable program product of claim 9, the instructions when executed in the one or more processors causing operations further comprising:

establishing, in response to the application registering a call back with a communications stack, an original InfiniBand Direct Connect queue-pair connection between the initiator and the at least one target endpoints.

13. The computer usable program product of claim 12, wherein the communications stack monitors a completion status of message communications between the initiator and the at least one target endpoints across an InfiniBand protocol based network.

14. The computer usable program product of claim 13, wherein the completion status comprises the unsuccessful completion status and a message undeliverable status, the message undeliverable status associated with the at least one target endpoint indicated as communicatively unreachable.

15. The computer usable program product of claim 14, the instructions when executed in the one or more processors causing operations further comprising:
storing, in a memory of the first server device, the messages indicated in accordance with the message undeliverable status;
invoking, for each of the destinations that cannot be reached, the callback as registered with the communications stack; and
signaling, by the application, the communications stack in notification of the messages that could not be dispatched in accordance with the message undeliverable status.

16. The computer usable program product of claim 9, wherein the at least one application comprises a first application under execution at the first server device, and a second application under execution at the second server device.

17. The computer usable program product of claim 9, wherein the stored program instructions are stored in a computer-readable storage medium in a data processing system, and wherein the stored program instructions are transferred over a network from a remote data processing system.

18. The computer usable program product of claim 9, wherein the stored program instructions are stored in a computer-readable storage medium in a server data processing system, and wherein the stored program instructions are downloaded over a network to a remote data processing system for use in a computer-readable storage medium associated with the remote data processing system, further comprising:
program instructions to meter use of the computer usable code associated with the request; and
program instructions to generate an invoice based on the metered use.

19. A computer system comprising one or more processors, one or more computer-readable memories, and one or more computer-readable storage devices, and program instructions stored on at least one of the one or more storage devices for execution by at least one of the one or more processors via at least one of the one or more memories, the program instructions when executed in the one or more processors causing operations comprising:
detecting, using the one or more processors, that an InfiniBand (IB) queue pair has transitioned into an error state based on an unsuccessful completion status, the unsuccessful completion status relating to unsuccessful delivery of a message from an initiator endpoint at a first server device to at least one target endpoint at a second server device, the initiator and at least one target endpoints associated with at least one application under execution;

inferring, using the one or more processors based on the unsuccessful completion status of the message being indicated as flushed in a memory of the first server device, that the message was in a send queue of the IB queue pair when the IB queue pair transitioned into the error state;

establishing, based on the inferring, an IB Direct Connect queue pair connection between the at least one target endpoint and the initiator endpoint; and re-queueing, in accordance with the IB Direct Connect queue pair connection, the message in the IB queue pair for dispatch to the at least one target endpoint.

20. The computer system of claim 19, wherein the first and second server devices are communicatively coupled within an InfiniBand protocol based network.

* * * * *